US005774881A

United States Patent [19]
Friend et al.

[11] Patent Number: 5,774,881
[45] Date of Patent: Jun. 30, 1998

[54] METHOD OF DETERMINING OPTIMAL ASSET ALLOCATION UTILIZING ASSET CASH FLOW SIMULATION

[75] Inventors: Edward H. Friend, Washington, D.C.; Robert T. McCrory, Seattle, Wash.

[73] Assignee: EFI Actuaries, Washington, D.C.

[21] Appl. No.: 550,503

[22] Filed: Oct. 30, 1995

[51] Int. Cl.[6] .................................................. G06F 17/60
[52] U.S. Cl. ................................................................ 705/36
[58] Field of Search .................................. 395/235, 236, 395/237; 705/35, 36, 37

[56] References Cited

PUBLICATIONS

IBM (Dick Shareshian), Funds Allocation System, The Funds Management Group, Inc., 1985.
Ranftle et al., Helping Employees Invest Wisely, HRMagazine, Nov. 1993.

*Primary Examiner*—Robert A. Weinhardt
*Assistant Examiner*—Junghoon Kenneth Oh
*Attorney, Agent, or Firm*—Lowe, Price, LeBlanc & Becker

[57] ABSTRACT

The invention provides a method of simulating future cash flow for a given asset allocation under a variety of economic conditions, comparing the results of the simulation to a predefined risk tolerance baseline, and preferably adjusting the asset allocation until the results of the simulation reflect a maximum rate of return for a given risk tolerance. The simulation of cash flow generates a plurality of asset cash flow projections for a given asset allocation that are preferably graphically represented with respect to the predefined risk tolerance baseline. The risk tolerance baseline is plan specific and is preferably set to a multiple of a preferred risk factor such as percentage of payroll cost or benefit cost. The occurrence of an asset cash flow projection falling below the risk tolerance baseline defines a risk tolerance failure event. The number of risk tolerance failure events occurring for the asset cash flow projections associated with a given asset allocation is indicative of whether that asset allocation produces an acceptable risk tolerance level. The asset allocation is adjusted and the process is repeated until the highest average value of all asset cash flow projections is achieved within an acceptable number of risk tolerance failure events.

14 Claims, 7 Drawing Sheets

Microfiche Appendix Included
(3 Microfiche, 206 Pages)

METHOD OF DETERMINING OPTIMAL ASSET ALLOCATION UTILIZING ASSET CASH FLOW SIMULATION

MICROFICHE APPENDIX

A Microfiche Appendix is enclosed. The Microfiche Appendix includes three sheets with a total of 206 frames.

FIELD OF THE INVENTION

The invention relates generally to methods of determining an optimum allocation of assets to generate a maximum rate of return for an investment portfolio, such as a pension fund, at a minimal cost. More specifically, the invention provides a method of simulating future cash flow for a given asset allocation under varying economic conditions, comparing the results of the simulation to a predefined risk baseline, and adjusting the asset allocation until the results of the simulation reflect a maximum rate of return at a minimal cost for a given risk factor.

BACKGROUND OF THE INVENTION

Trustees of pension funds seek the highest possible investment return within acceptable risk parameters.

Heavy investments in common stock produces high returns, for example, but these returns are volatile, and losses due to stock volatility may severely impact plan cost. Investments in cash equivalents are far less volatile, but yields are unacceptably low and, accordingly, for plans with such assets, costs are unacceptable high. An optimum asset allocation made up of stocks, bonds, real estate, cash equivalents and other asset classes is therefore desirable to minimize volatility while maintaining acceptable returns. It is difficult, however, to determine what mix of asset classes and in what proportion produces the best results at an acceptable level of risk.

Various methods are currently used by pension fund managers in an attempt to maximize return. For example, one such method of solving the problem of maximizing return involves developing the asset allocation likely to produce the highest return at a given level of performance volatility. This method, however, is not a plan specific solution and therefore may not produce the best results for a given plan. Another approach is to develop the asset allocation which, within a stipulated time horizon at the calculated plan contribution level, will lead to an acceptable probability of achieving a selected funded ratio of assets to liabilities. While this approach is plan specific, as different solutions apply to different plans with different levels of assets, such an approach requires a sophisticated understanding of the manner in which liabilities are developed. For example, funding ratios can change with changes in actuarial assumptions, creating a degree of artificiality in the measurement. Moreover, a focus on a stipulated time horizon involves a restricted view which can be modified only upon considerable revision. Finally, funding ratios relate to liabilities for accrued benefits from a "shut down" point of view and are not reflective of ongoing plan conditions. While private sector plans are subject to "shut down", this is not a meaningful characteristic of a public sector plan.

In view of the above, it is an object of the invention to provide a method of determining an optimum allocation of assets to generate a maximum rate of return for an investment portfolio at a minimal cost within an acceptable risk level that overcomes the deficiencies of the conventional methods discussed above.

SUMMARY OF THE INVENTION

The invention provides a method of simulating future cash flow for a given asset allocation under a variety of economic conditions, comparing the results of the simulation to a predefined risk tolerance baseline, and preferably adjusting the asset allocation until the results of the simulation reflect a maximum rate of return for a given risk tolerance. The simulation of cash flow generates a plurality of asset cash flow projections for a given asset allocation that are preferably graphically represented with respect to the predefined risk tolerance baseline. The risk tolerance baseline is plan specific and is preferably set to a multiple of a preferred risk factor such as percentage of payroll cost or benefit cost. The occurrence of an asset cash flow projection falling below the risk tolerance baseline defines a risk tolerance failure event. The number of risk tolerance failure events occurring for the asset cash flow projections associated with a given asset allocation is indicative of whether that asset allocation produces an acceptable risk tolerance level. The asset allocation is adjusted and the process is repeated until the highest average value of all asset cash flow projections is achieved within an acceptable number of risk tolerance failure events.

BRIEF DESCRIPTION OF THE DRAWINGS

The invention will be described in greater detail with reference to the accompanying drawings, wherein.

DETAILED DESCRIPTION OF THE PREFERRED EMBODIMENT

Figure 1:
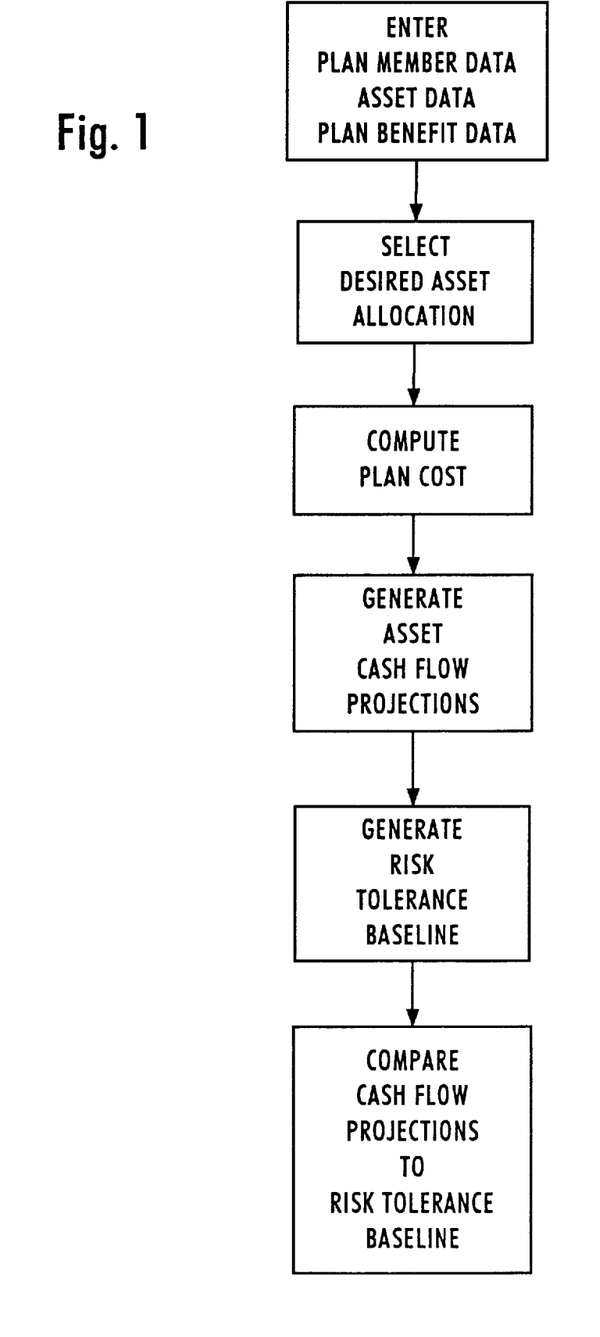
FIG. 1 is a basic flow diagram of a method in accordance with the present invention.

A general flow diagram of the method implemented using a general purpose computer in accordance with the invention is illustrated in FIG. 1. An operator interface is utilized to permit an operator to enter plan member definition information, asset information, and plan benefit information for a given pension plan into a computer database. Alternatively, the required information is downloaded from a remote source to the computer.

The operator selects the percentage of available assets to be allocated to specific asset classes contained in an asset allocation list previously stored in the computer. The asset allocation list, for example, may include domestic equities (large cap), small cap equities, international equities, long term corporate bonds, long term government bonds, intermediate term government bonds, real estate and cash equivalents. Alternatively, the operator may be prompted to enter a desired asset allocation list which is then stored in the computer.

The projected level percentage or average percentage of payroll contribution to implement the plan is then preferably computed based on the selected asset allocation by averaging the results of a plurality of projections of costs developed by uniform methodology taking into account assets on hand, simulations of future investments returns, simulations of future benefit disbursements and simulations of future payrolls. The simulations utilize demographic data contained in the plan member definition information entered by the operator, as well as the asset information and plan benefit information.

A simulation is then run to generate a plurality of asset cash flow projections, preferably one hundred or more, based on the defined asset allocation entered by the operator. The plurality of asset cash flow projections preferably reflect simulation of future behavior of the asset classes as impacted by simulated future investment returns (both realized and unrealized), simulated benefit disbursements, and by the average annual level percentage of payroll contribution necessary to maintain the plan on a sound financial basis into the indefinite future. In a preferred embodiment, a comprehensive database of historical Consumer Price Indices (CPI's) and historical market results for stocks, bonds and cash equivalents are sampled to generate the asset cash flow projections. The historical database may either be preselected from a restored database or the operator may be given the option of choosing a specific historical database of a specified number of years from a larger restored database. In addition to generating a plurality of individual asset cash flow projections, an average asset cash flow projection is generated to indicate the average result of all possible simulation scenarios.

A risk tolerance baseline is then generated by the computer based on a predefined risk tolerance factor. For example, the operator may select the risk tolerance factor to be a multiple of the projected future percentage of payroll costs or future benefits cash flow. Other factors may also be employed The set of cash flow projections are then compared with the risk tolerance baseline by the computer and the number of risk tolerance failure events, i.e. when an asset cash flow projection falls below the risk tolerance baseline is calculated, to determine a total number of risk tolerance failure events. In a preferred embodiment, the asset cash flow projections, the average asset cash flow projection, the risk tolerance baseline and the total number of risk tolerance failure events are graphically presented (although other methods of representing the data may also be employed), either on a display monitor or on a printed hard copy, to enable the operator to quickly determine whether the defined asset allocation meets risk tolerance requirements while providing an acceptable return at an acceptable cost.

In the event that such factors are not met, the operator can manually adjust the asset allocation to repeat the process until risk tolerance requirements are met at an acceptable return and cost. It is preferably, however, to utilize a software routine to repeat the basic process with different asset allocations to define the most preferred asset allocation based on predefined factors including cost, acceptable failure events and acceptable returns, thereby optimizing the process to a level that would be difficult to achieve by manually selecting different asset allocations at random.

An example of the implementation of the method illustrated in FIG. 1 will be described with reference to FIGS. 2–7. In the illustrated example, which is based on an analysis of the California Highway Patrol program component of the California Public Employee's Retirement System, it will be assumed that the pension fund managers have defined a risk factor as six times the cost of benefits, i.e. future benefits cash flow, wherein there cannot be a 10% or greater chance that asset cash flow will fall below this level in a ten year horizon.

Figure 2:
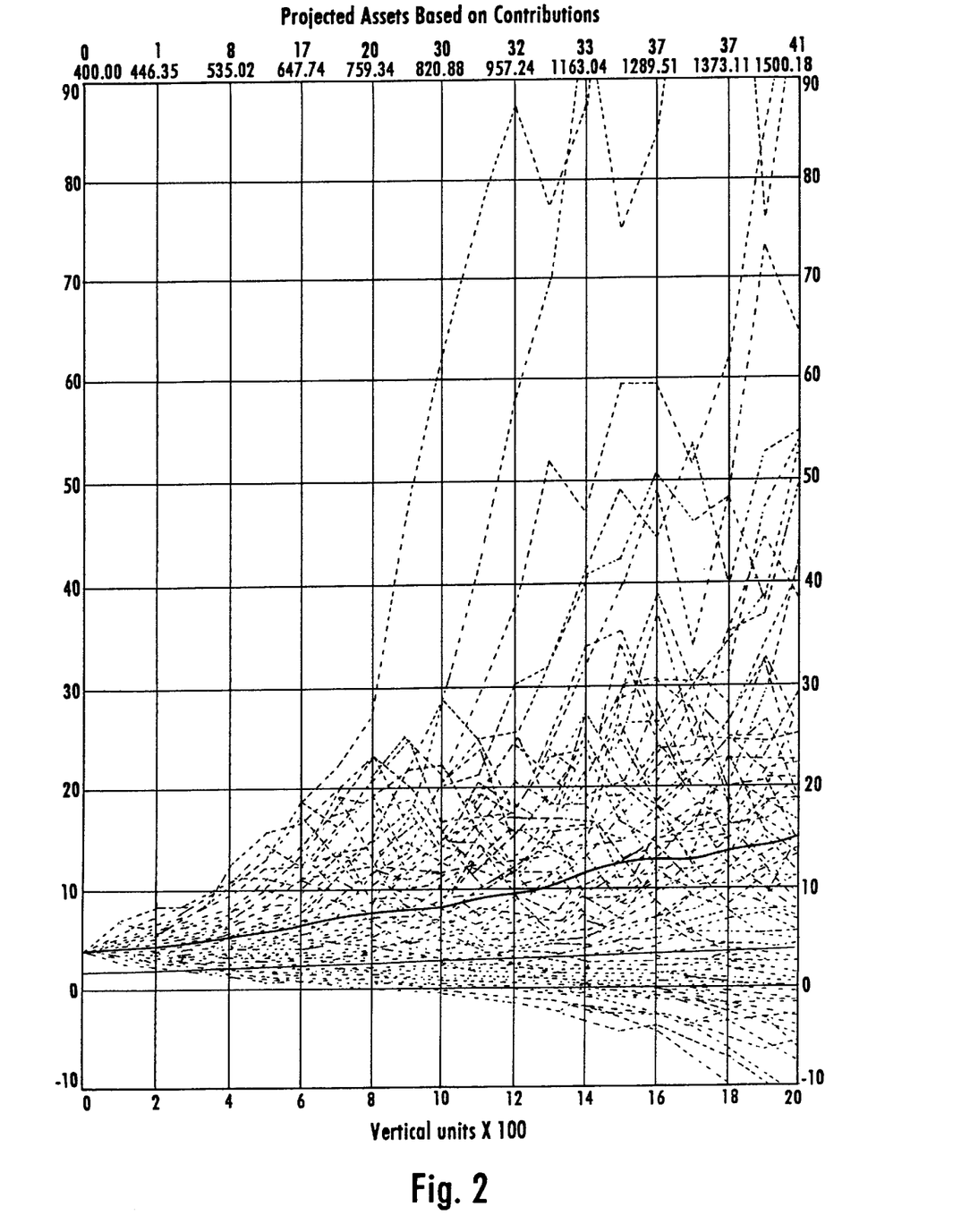
FIG. 2 is a graphical representation of the results generated by the method illustrated in FIG. 1 with an asset allocation of 100% small cap equities.

FIG. 2 illustrates the results generated by the performance of the method illustrated in figure one for a pension fund having assets of 400% of payroll when the asset allocation is set to 100% small cap equities, wherein one hundred simulations of future asset cash flow projections for a period of twenty years are represented by the broken lines, an average asset cash flow projection is illustrated as a solid line (A), and a risk tolerance baseline representative of six times benefits cash flow projection is shown by a solid line (B). After a ten year period, thirty risk tolerance failure events have occurred in which a cash flow projection has fallen below the risk tolerance baseline. Accordingly, while the future level percentage of payroll cost has been calculated as about 15.55% for this illustrated example, there is a relatively high risk that the fund will not meet the defined acceptable risk tolerance.

Figure 3:
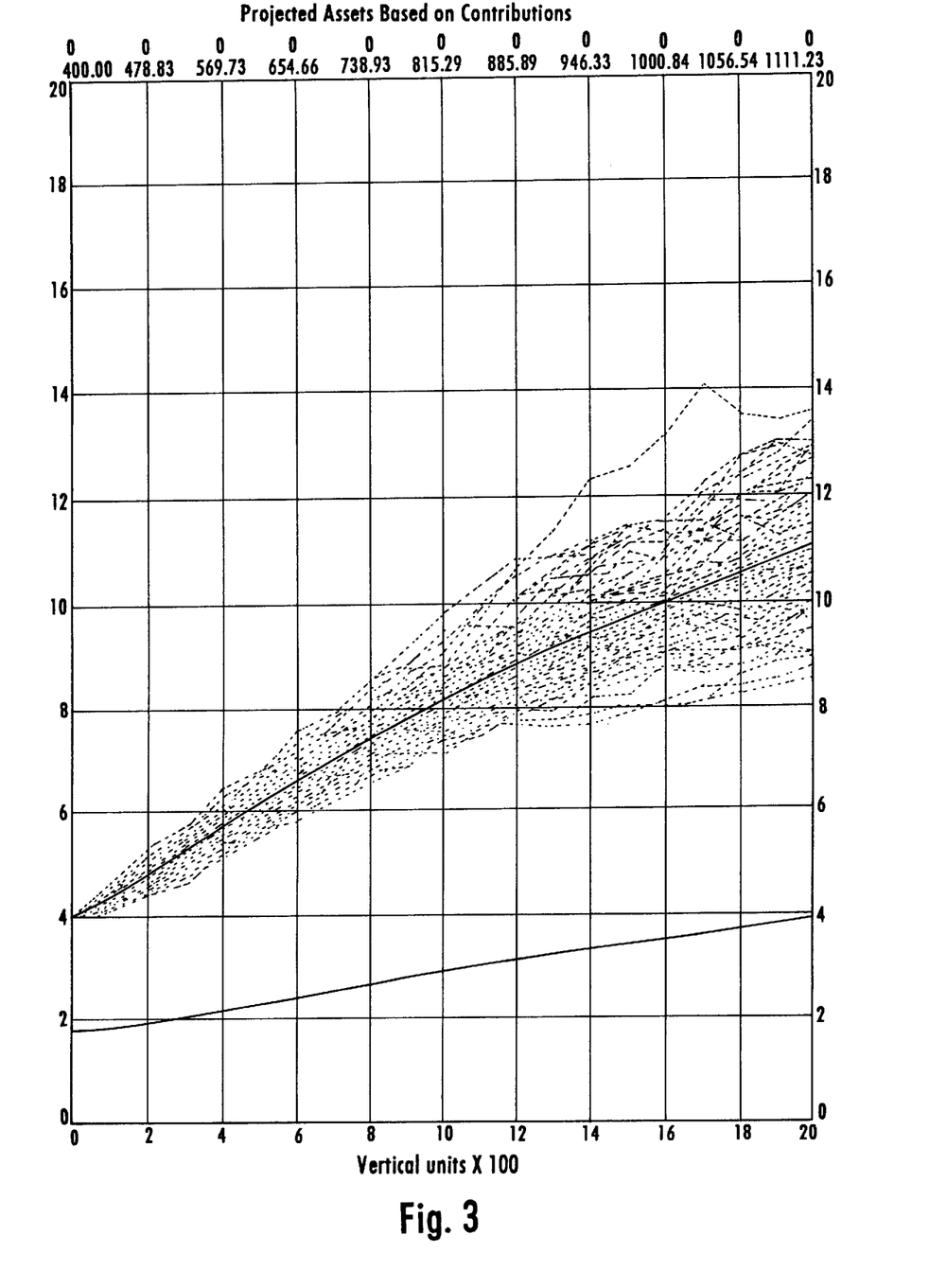
FIG. 3 is a graphical representation of the results generated by the method illustrated in FIG. 1 with an asset allocation of 100% cash equivalents.

A lesser degree of risk can be obtained by changing the asset allocation to less volatile investments. FIG. 3 illustrates the results when the asset allocation is changed to 100% cash equivalents. While the number of risk tolerance failure events has dropped to zero, the cost of the plan has been calculated to have increased to an unacceptable level of 62.76% of payroll contributions.

Figure 4:
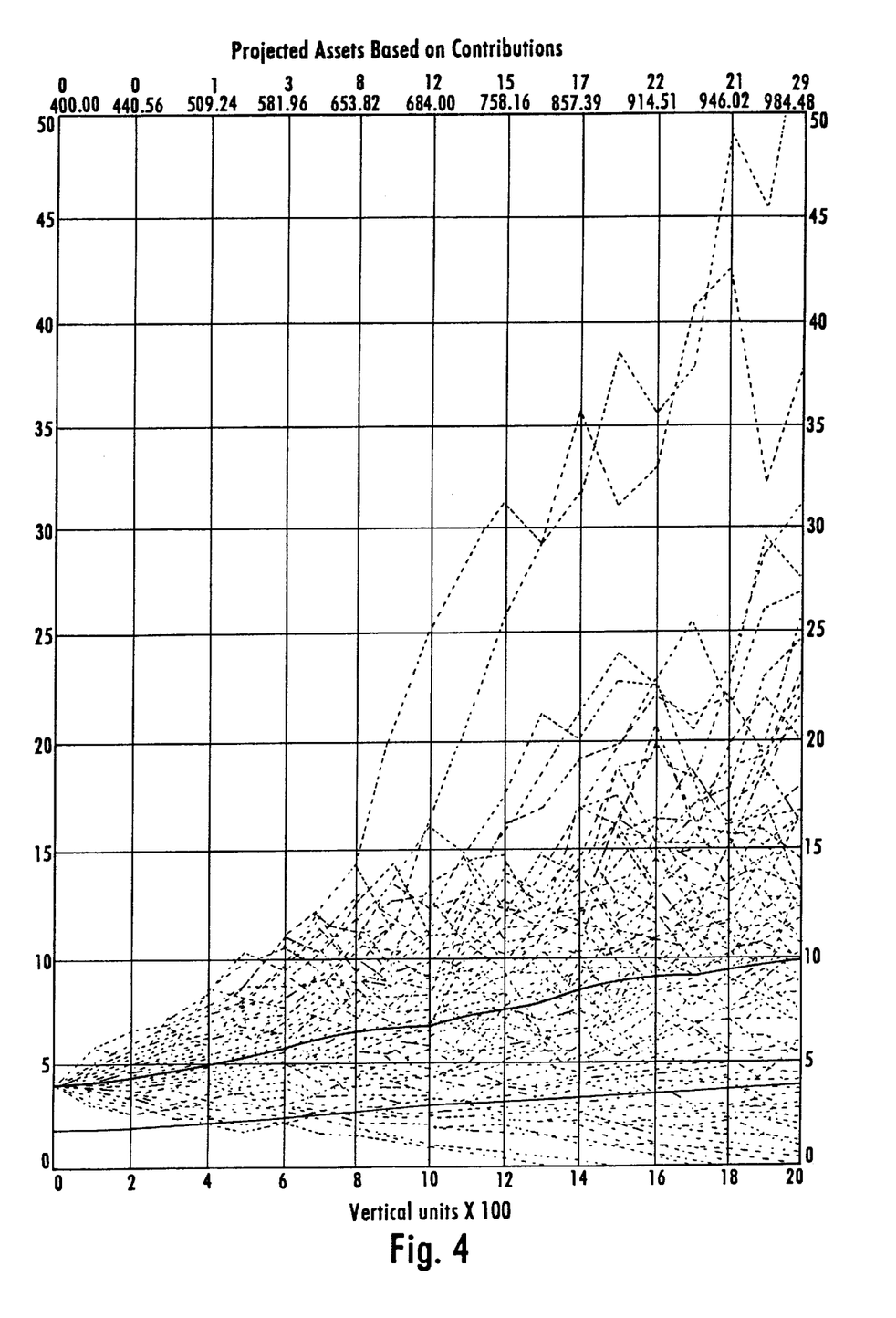
FIG. 4 is a graphical representation of the results generated by the method illustrated in FIG. 1 with mixing the asset allocation to 60% small cap equities and 40% of cash equivalents.

FIG. 4 illustrates a mixing the asset allocation to 60% small cap equities and 40% of cash equivalents. The projected future level percentage of payroll cost has been calculated to be 24.63% for this example and the number of risk tolerance failure events at the ten year horizon is twelve. Thus, FIG. 4 illustrates the tradeoffs associated with mixing of assets with difference degrees of volatility, namely, a reduction in costs but an associated increase in risk. In this example, the number of risk tolerance failures still exceeds the established acceptance rate of 10% defined by the fund managers.

Figure 5:
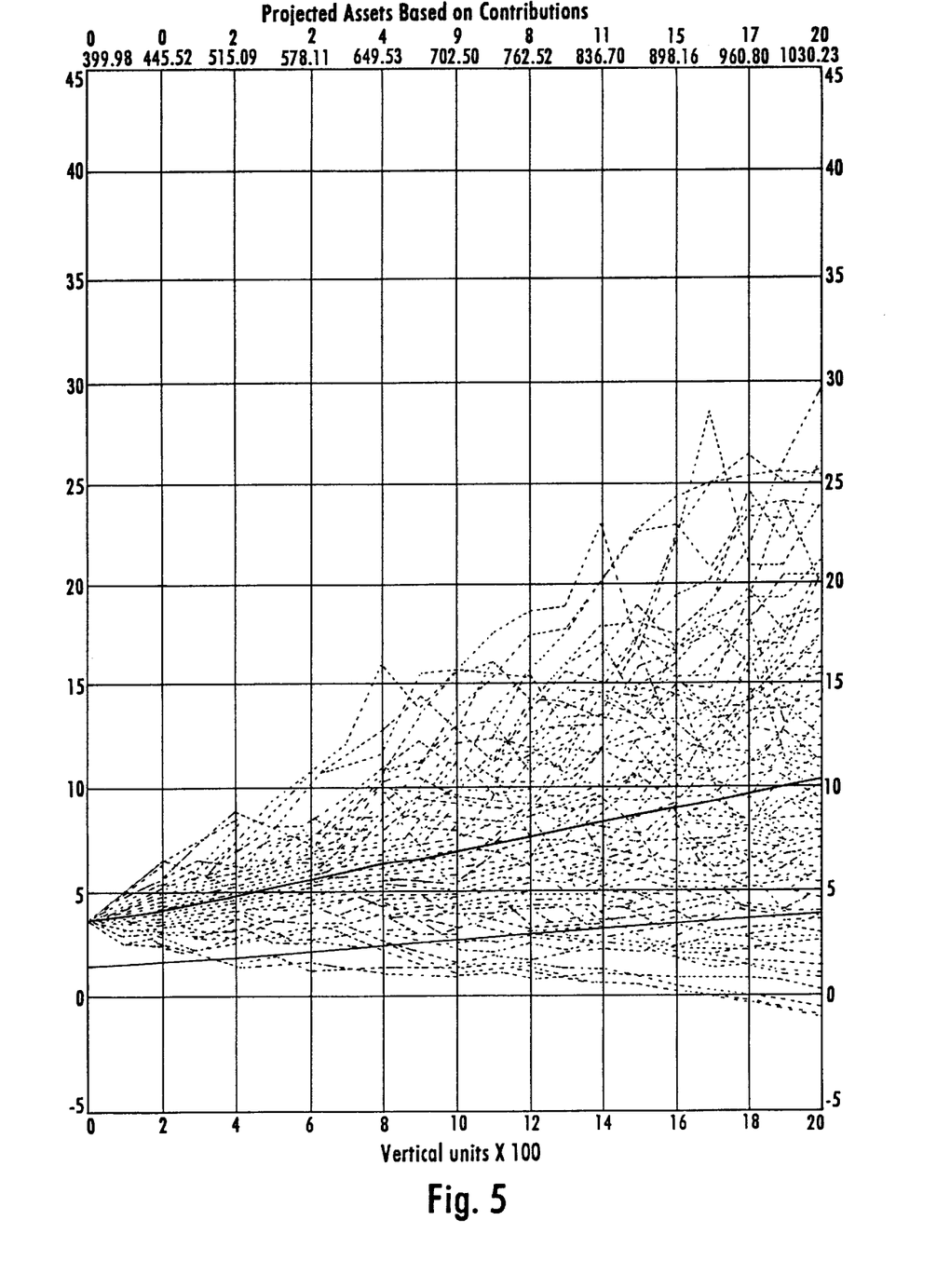
FIG. 5 is a graphical representation of the results generated by the method illustrated in FIG. 1 with an asset allocation of 39% domestic equities (large cap), 6% small cap equities, 20% international equities, 24% long term corporate bonds, 9% long term government bonds, 0% intermediate term government bonds, 0% real estate and 2% cash equivalents.
Figure 6:
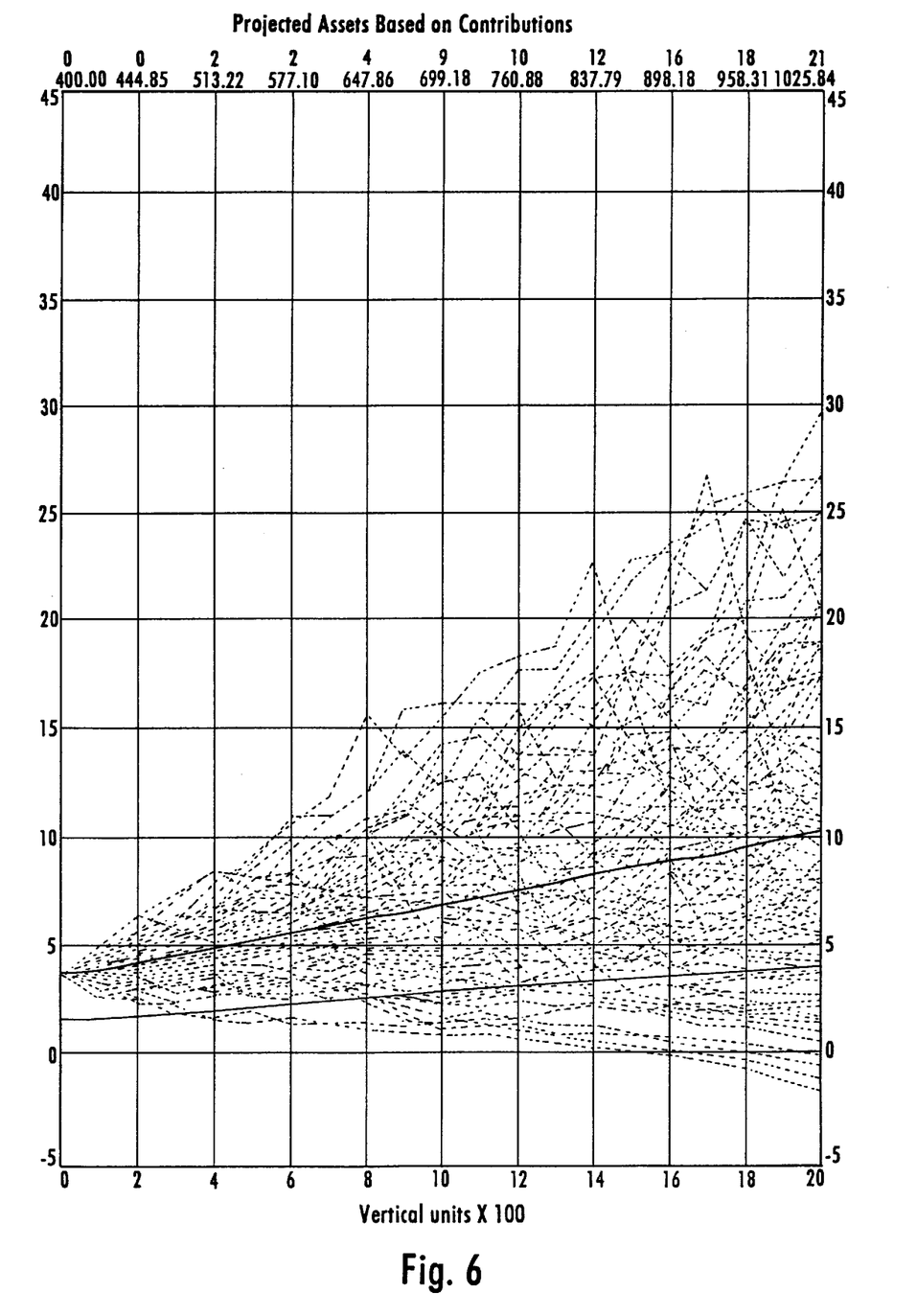
FIG. 6 is a graphical representation of the results generated by the method illustrated in FIG. 1, wherein costs can be improved to 30.49% of payroll without increasing risk by making a slight change in the asset allocation to 44% domestic equities, 6% small cap equities, 20% international equities, 14% long term corporate bonds, 9% long term government bonds, 0% intermediate term government bonds, 5% real estate and 2% cash equivalents.
Figure 7:
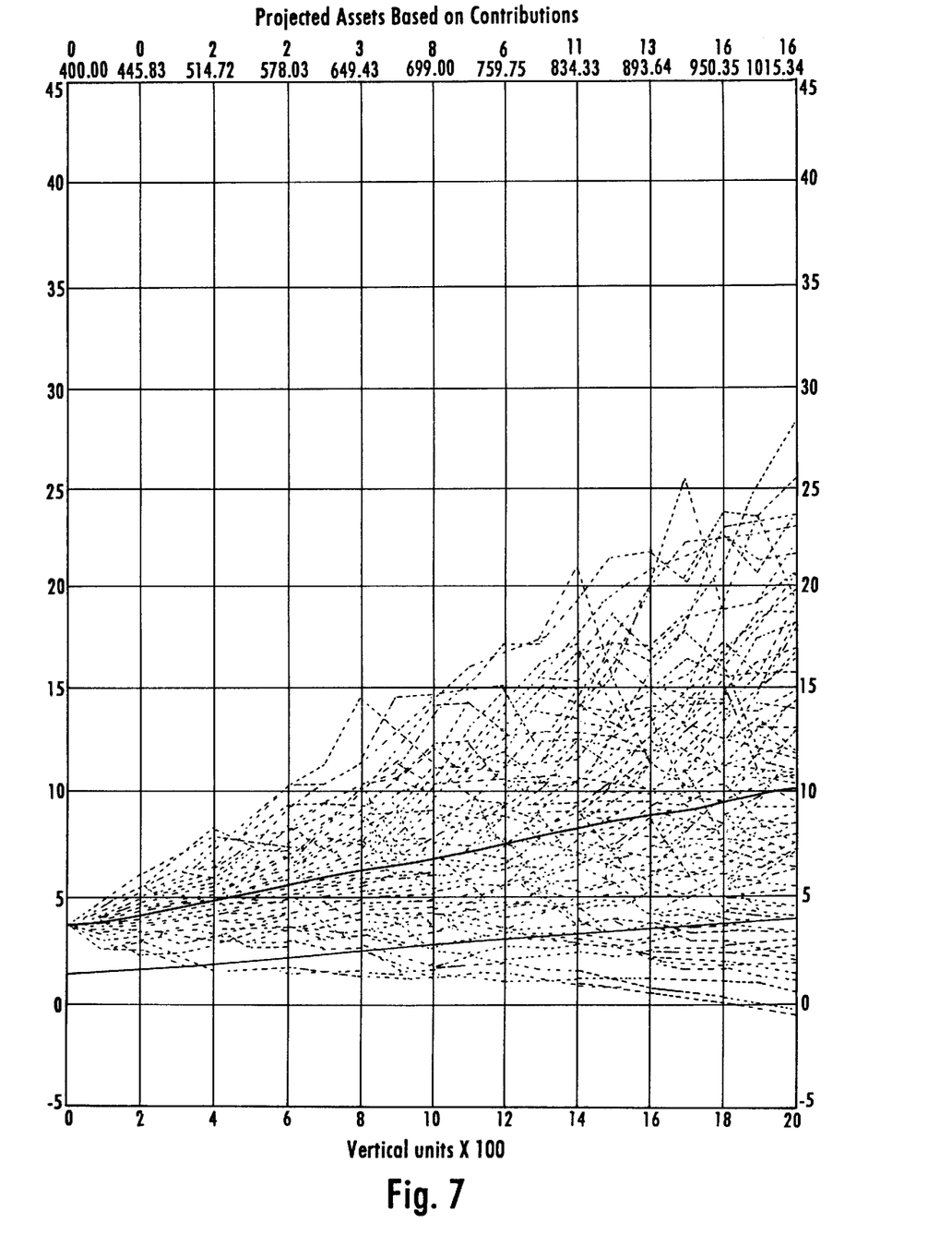
FIG. 7 is a graphical representation of the results generated by the method illustrated in FIG. 1, wherein risk can be improved with only a slight increase in cost, namely 32.68%, by changing asset allocation to 44% domestic equities, 6% small cap equities, 15% international equities, 14% long term corporate bonds, 9% long term government bonds, 0% intermediate term government bonds, 5% real estate and 7% cash equivalents as illustrate in FIG. 7.

FIGS. 5–7 illustrate examples of how the tradeoffs between cost and risk can be maximized. FIG. 5 illustrates an asset allocation of 39% domestic equities (large cap), 6% small cap equities, 20% international equities, 24% long term corporate bonds, 9% long term government bonds, 0% intermediate term government bonds, 0% real estate and 2% cash equivalents. The cost of the asset allocation in FIG. 5 has been calculated as 31.96% of payroll cost with nine failures, which falls within the acceptable 10% range. Costs can be improved to 30.49% of payroll without increasing risk by making a slight change in the asset allocation to 44% domestic equities, 6% small cap equities, 20% international equities, 14% long term corporate bonds, 9% long term government bonds, 0% intermediate term government bonds, 5% real estate and 2% cash equivalents as illustrated in FIG. 6. Risk can be improved with only a slight increase in cost, namely 32.68%, by changing asset allocation to 44% domestic equities, 6% small cap equities, 15% international equities, 14% long term corporate bonds, 9% long term government bonds, 0% intermediate term government bonds, 5% real estate and 7% cash equivalents as illustrate in FIG. 7.

Although any desired method may be utilized to calculate the average level percentage of payroll contribution, asset cash flow projections and benefit cash flow projections utilized in the method of the invention, it is preferable to implement the invention as an improvement of currently available financial modeling software. Specifically, V&A (tm) financial modeling software currently available from EFI Actuaries of Washington, D.C. provides modeling of pension funds based on cash flow analysis. The principle functions of the V&A software, including its user interface, may therefore be adapted to implement the instant invention. A tutorial of the V&A software is provided in Appendix A, which is an integral part of the present application. In addition, a source program listing of the principle modules utilized in the V&A software is provided in Appendix B which is also an integral part of the present application. The V&A software, however, does not incorporate the comparison of the asset cash flow projections to a risk tolerance baseline in order to identify risk tolerance failure events, which forms the basis of the present invention.

The invention has been described with reference to certain preferred embodiments thereof. It will be understood, however, that modifications and variations are possible within the scope of the appended claims.

For example, as a further refinement, a DynaFlow (tm) approach to asset cash flow line can be implemented, wherein at each interval, six months, one year, etc., the asset level of each projection line is tested. The asset allocation is optimized once again at each such point using the same process as described earlier. Thus, projection lines are altered in reflection of the approach and the optimum level percentage of payroll further optimized This enables determination of that level percentage of payroll sufficient to maintain on a sound financial basis into the indefinite future based on continual reoptimization of the asset allocation. The dynamic asset allocation produced by this process reflects the most favorable asset allocation at any point in time.

It should be noted that the Microfiche Appendix which is included as part of the specification and description of the invention, is subject to copyright protection and may not be reproduced in any manner or used for any purpose other than as an integral part of this specification to gain an understanding of the invention described herein.

What is claimed is:

1. A computer program product storing computer instructions therein for instructing a computer to perform a process for determining a plan specific optimal asset allocation utilizing cash flow simulation, the program product comprising:

a recording medium readable by the computer; and
the computer instructions stored on said recording medium instructing the computer to perform the process, the instructions including:
(a) entering plan member information including active and inactive member information, asset information, and plan benefit information including plan specific definitions of risk for a given retirement plan;
(b) selecting a range of tolerable asset allocations for specific asset classes contained in an asset allocation list, the asset allocation list comprising a fixed class of investment and an equity class of investment, said selecting step (b) selecting maximum and minimum tolerable asset allocations for each of the fixed and equity classes of investments;
(c) generating one or more risk tolerance baselines based on one or more user defined risk tolerance factors;
(d) simulating benefit and asset cash flows as future financial projections based on the selected asset allocation and on the plan benefit information;
(e) determining if risk tolerance failure events occur by comparing the future financial projections with the one or more risk tolerance baselines;
(f) determining a performance index for the selected asset allocation based on a weighted average of the occurrence of the risk tolerance failure events and the cost of the plan; and
(g) repetitively performing said steps (d), (e) and (f) for different asset allocations within the range of tolerable asset allocations generating a plurality of performance indices, and determining an optimum asset allocation having a best performance index from among the plurality of performance indices.

2. A computer program product storing computer instructions therein for instructing a computer to perform a process for determining a plan specific optimal asset allocation utilizing cash flow simulation, the program product comprising:

a recording medium readable by the computer; and
the computer instructions stored on said recording medium instructing the computer to perform the process, the instructions including:
entering plan member definition information, asset information, and plan benefit information for a given financial plan into a computer;
selecting an asset allocation for specific asset classes contained in an asset allocation list previously stored in the computer;
generating a plurality of asset cash flow projections based on the selected asset allocation;
generating a single baseline, simulation average baseline or collection of risk tolerance baselines based on (i) a single predefined risk tolerance factor, (ii) an average of the risk tolerance factors evolving from all the asset cash flow projections in each simulation or (iii) a separate risk tolerance factor evolving from each cash flow projection within each simulation trial;
determining if a risk tolerance failure event occurs by comparing the asset cash flow projection with the risk tolerance baseline projection(s) underlying the said simulation and repeating this process for other asset allocations until that asset allocation generating the lowest rate of risk tolerance failure is found to determine the optimum asset allocation.

3. A computer program product storing computer instructions therein for instructing a computer to perform a process for determining a plan specific optimal asset allocation utilizing cash flow simulation, the program product comprising:

a recording medium readable by the computer; and
the computer instructions stored on said recording medium instructing the computer to perform the process, the instructions including:

(a) entering plan profile information (including how entering members are typically distributed as to sex, age, and initial year salary), active employee data (including sex, date of birth, date of hire, salary, accumulated employee contributions) and inactive member data (including sex, date of birth, date of retirement, amount of monthly pension, form of pension, profile of spouse), anticipated growth (decline) characteristics of membership, demographic assumptions as to employee turnover, disability, and retirement, member mortality, and merit salary increase expectations, asset information (including current market value, current asset allocation by class), economic assumptions (including assumed rate of return on plan assets and assumed CPI increase, for gain and loss purposes) and plan of benefits in place (including definition and conditions for entitlement to service, vested, disability, and other benefits), employee contribution requirements, third-party financing input and employer funding method in place;

(b) selecting a range of tolerable asset allocations for specific asset classes contained in an asset allocation list, the asset allocation list comprising a fixed income class of investments, and an equity class of investments, said selecting step (b) also selecting maximum and minimum tolerable asset allocations for each of the fixed and equity classes of investments;

(c) for a tentatively selected asset allocation within the tolerable range, generating (projecting over a designated future time frame in stochastic manner by Monte Carlo simulation) multiple cash flow forecasts of (i) plan assets and (ii) one or more user-selected risk tolerance baselines; and determining a weighted average measure of risk tolerance failure (unfavorable outcomes) by computer examination of the number of crossing violations of the risk tolerance baselines; and generating, on a computer monitor for printout display and analysis, a reflection of the depth (degree of badness) of crossing violations as well as the height (degree of goodness) of favorable outcomes, where:

Plan assets are projected into the future by starting with assets on hand, subtracting benefits as they are projected to be disbursed, adding projected employee and third-party contributions, introducing projected investment returns and such projected percentage of payroll employer contributions as are necessary to maintain financial soundness of the plan.

Risk tolerance baselines include
  a user-selected multiple of benefits,
  a projected percentage of payroll employer contribution level at more (less) than the initial level by a user-designated margin,
  a user-designated percentage of user-defined liabilities,
  that diminished level of assets from which return to the initially assumed rate of investment return within a user-selected number of years has a lower user-designated probability of occurrence than acceptable to the user, and other comparable user-designated alternatives Benefits are usually dependent on final average salary which in turn is dependent on projected historical (or modified historical) or parametrically developed wage deflators.

Projected investment returns of individual asset classes are either the interaction of projected inflation deflators and real (net of inflation) asset class returns generated independently of each other or in tandem, with projections historically (or modified historically) or parametrically developed. Alternatively, projected nominal rates of return of individual asset classes are extracted from history by stringing together consecutive periods of user-selected length.

Projected percentage of payroll employer contributions are dependent on feedback from the results of other simulated inflows and outflows, the overlay of computer-developed amortization over a user-selected amortization period of investment return gains and losses relative to an underlying user-selected baseline rate of return, such percentage of payroll employer contributions to reflect the requirement that employer contributions be the balancing item to maintain financial soundness of the plan.

(d) repetitively performing step (c) for different asset allocations within the tolerable range until the asset allocation having the lowest weighted average measure of risk tolerance failure, or performance index, is determined.

4. A computer program product according to claim 3, wherein said generating step (c) further comprises the step of including, in a determination of the best performance index, risk tolerance failures (unfavorable outcomes) at or within different intervals (whether or not weighted as to importance).

5. A computer program product according to claim 3, wherein said generating step (c) further comprises the step of including, in a determination of the best performance index, a weighted measure of the cost of the plan.

6. A computer program product according to claim 3, wherein said generating step (c) further comprises the step of selecting another range of tolerable asset allocations for the specific asset classes contained in the asset allocation list.

7. A computer program product storing computer instructions therein for instructing a computer to perform a process for determining a plan specific optimal asset allocation utilizing cash flow simulation, the program product comprising:

a recording medium readable by the computer; and
the computer instructions stored on said recording medium instructing the computer to perform the process, the instructions including:

(a) entering plan profile information including entering member profile characteristics, active employee data, inactive member data, anticipated growth (decline) characteristics of membership, demographic assumptions as to employee turnover, disability, and retirement, member mortality, and merit salary increase expectations, asset information, economic assumptions, and plan of benefits in place, employee contribution requirements, third-party financing input and employer funding method in place;

(b) selecting a range of tolerable asset allocations for specific asset classes contained in an asset allocation list, the asset allocation list comprising a fixed income class of investments, and an equity class of investments, said selecting step (b) also selecting maximum and minimum tolerable asset allocations for each of the fixed and equity classes of investments;

(c) for a tentatively selected asset allocation within the tolerable range, generating (projecting over a designated future time frame in stochastic manner by Monte Carlo simulation) multiple cash flow forecasts of (i) plan assets and (ii) one or more user-selected risk tolerance baselines; and determining a weighted average measure of risk tolerance failure (unfavorable outcomes) by computer examination of the number of crossing violations of the risk tolerance baselines; and generating, on a computer monitor for printout display and analysis, a reflection of the depth (degree of badness) of crossing violations as well as the height (degree of goodness) of favorable outcomes, where:

Plan assets are projected into the future by starting with assets on hand, subtracting benefits as they are projected to be disbursed, adding projected employee and third-party contributions, introducing projected investment returns and such projected percentage of payroll employer contributions as are necessary to maintain financial soundness of the plan.

Risk tolerance baselines include
  a user-selected multiple of benefits,
  a projected percentage of payroll employer contribution level at more (less) than the initial level by a user-designated margin,
  a user-designated percentage of user-defined liabilities,
  that diminished level of assets from which return to the initially assumed rate of investment return within a user-selected number of years has a lower user-designated probability of occurrence than acceptable to the user, and
  other comparable user-designated alternatives Benefits are usually dependent on final average salary which in turn is dependent on projected historical (or modified historical) or parametrically developed wage deflators.

Projected investment returns of individual asset classes are either the interaction of projected inflation deflators and real (net of inflation) asset class returns generated independently of each other or in tandem, with projections historically (or modified historically) or parametrically developed. Alternatively, projected nominal rates of return of individual asset classes are extracted from history by stringing together consecutive periods of user-selected length.

Projected percentage of payroll employer contributions are dependent on feedback from the results of other simulated inflows and outflows, the overlay of computer-developed amortization over a user-selected amortization period of investment return gains and losses relative to an underlying user-selected baseline rate of return, such percentage of payroll employer contributions to reflect the requirement that employer contributions be the balancing item to maintain financial soundness of the plan.

(d) repetitively performing step (c) for different asset allocations within the tolerable range until the asset allocation having the lowest weighted average measure of risk tolerance failure, or performance index, is determined.

8. A computer program product storing computer instructions therein for instructing a computer to perform a process for determining a plan specific optimal asset allocation utilizing cash flow simulation, the program product comprising:

a recording medium readable by the computer; and the computer instructions stored on said recording medium instructing the computer to perform the process, the instructions including:

(a) entering plan profile information including active and inactive member information, asset information, and plan benefit and plan financing information including plan specific demographic assumptions for a given retirement plan;

(b) selecting a range of tolerable asset allocations for specific asset classes contained in an asset allocation list, the asset allocation list comprising a fixed income class of investments and an equity class of investments, said selecting step (b) also selecting maximum and minimum tolerable asset allocations for each of the fixed and equity classes of investments;

(c) generating, over a designated future time frame, one or more risk tolerance baselines including minimum level of plan assets, maximum or minimum level of plan costs, percentage of liabilities, required plan earnings, and other user-designated alternatives;

(d) simulating benefit and asset cash flows as future financial projections based on the selected asset allocation and on the plan profile information;

(e) determining the frequency (crossovers) of risk tolerance failure events by comparing the simulated future financial projections including liabilities, costs, benefits, recovery interest rate and assets with one or more risk tolerance baselines as of selected points in time or within selected time frames;

(f) generating, on a computer monitor for print-out display and analysis, a reflection of the depth (degree of badness) of crossing violations of said risk tolerance failure events as well as the height (degree of goodness) of favorable outcomes;

(g) determining a performance index for the selected asset allocation, based on (i) user-selected weighted average of the frequency of the various risk tolerance failures at (ii) user-selected points in time or during time intervals, and on (iii) user-selected weights on a measure of cost of the plan;

(h) repetitively performing said steps (d), (e), (f) and (g) for different asset allocations within the range of tolerable asset allocations until the plan specific optimal asset allocation having a best performance index is determined;

(i) selecting another range of tolerable asset allocations for the specific asset classes contained in the asset allocation list; and (j) simulating benefits and asset cash flows as additional future financial projections based on the newly selected range of tolerable asset allocations by repeating steps (d) through (h);

(k) determining another performance index for each newly selected range of tolerable asset allocations;

(l) repetitively performing said steps (i), (j) and (k) within other ranges of tolerable asset allocations until other plan specific optimal asset allocation having other best performance indices are determined;

(m) selecting the plan specific optimal asset allocation with the best performance index.

9. A computer program product storing computer instructions therein for instructing a computer to perform a process for determining a plan specific optimal asset allocation utilizing cash flow simulation responsive to plan information, a range of tolerable asset allocations and one or more risk tolerance baselines based on one or more user defined risk tolerance factors, the program product comprising:

a recording medium readable by the computer; and the computer instructions stored on said recording medium instructing the computer to perform the process, the instructions including:

(a) determining when a risk tolerance failure event occurs by comparing a future financial projection responsive to a selected asset allocation in the range of tolerable asset allocations with the one or more risk tolerance baselines;

(b) generating a performance index for the selected asset allocation responsive to at least the occurrence of the risk tolerance failure event; and (c) repeating steps (a) and (b) for a plurality of selected asset allocations in the range of tolerable asset allocations generating a plurality of performance indices, and determining an optimum asset allocation having a best performance index from among the plurality of performance indices.

10. A computer program product according to claim 9, wherein said generating step (b), further comprises the step of generating a performance index for the selected asset allocation based on a weighted average of the occurrence of the risk tolerance failure event and a cost of the plan.

11. A computer program product storing computer instructions therein for instructing a computer to perform a process for determining a plan specific optimal asset allocation utilizing cash flow simulation responsive to plan information, a range of tolerable asset allocations and one or more risk tolerance baselines based on one or more user defined risk tolerance factors, the program product comprising:

a recording medium readable by the computer; and the computer instructions stored on said recording medium instructing the computer to perform the process, the instructions including:

(a) determining the frequency of risk tolerance failure events within any selected future time interval by counting the number of crossings of (i) a specified number of simulations of projected plan assets, projected plan costs or a projection of any other evolving financial characteristic of the plan over (ii) one or more risk tolerance baselines, where plan assets are allocated to any one of a number of asset class configurations within a particular range of tolerable asset allocations (b) generating for each asset allocation within the tolerable range a weighted average failure rate frequency performance index, wherein the frequency of failure to avoid each user selected risk tolerance factor at each user specified interval is given a user assigned weight; and (c) repeating steps (a) and (b) for a sufficient number of asset allocations within the tolerable range so as to determine the particular asset allocation with the best performance index.

12. A computer program product according to claim 11, wherein said determining step (a) includes consideration of other tolerable asset ranges.

13. A computer program product according to claim 12, wherein said generating step (b) comprises the step of generating a measure of the cost of the plan to be included, with its user selected weight, as a component of the performance index.

14. A computer program product according to claim 13, wherein said determining step (a) further comprises a display of the depth (degree of badness) of crossing violations of said risk tolerance failure events as well as the height (degree of goodness) of favorable outcomes.

* * * * *